United States Patent [19]

Urbanek et al.

[11] 4,277,818
[45] Jul. 7, 1981

[54] COMBINED HEADLIGHT, TURN SIGNAL AND PARKING LAMP FOR SNOW PLOWS AND THE LIKE

[75] Inventors: Karel Urbanek, Weston; Arthur F. Bleiweiss, Toronto, both of Canada

[73] Assignee: Dominion Auto Accessories Limited, Toronto, Canada

[21] Appl. No.: 108,967

[22] Filed: Dec. 31, 1979

[51] Int. Cl.³ .......................... B60Q 3/00; F21V 29/00
[52] U.S. Cl. ....................................... 362/61; 362/267
[58] Field of Search ................. 362/61, 267, 362, 368, 362/369

[56] References Cited

U.S. PATENT DOCUMENTS

| 1,590,376 | 6/1926 | Hyatt | 362/362 X |
| 1,751,965 | 3/1930 | Woolfenden | 362/267 X |
| 1,792,398 | 2/1931 | Rothen | 362/267 |
| 1,883,466 | 10/1932 | Bamford | 362/362 X |
| 2,619,582 | 11/1952 | Morse | 362/267 |
| 3,192,376 | 6/1965 | Najimian | 362/61 |

Primary Examiner—Donald A. Griffin

Attorney, Agent, or Firm—Barnes, Kisselle, Raisch & Choate

[57] ABSTRACT

A combined lamp and turn signal for a snow plow or the like comprising a housing which supports a sealed beam headlight lamp bulb and a signal and parking lamp bulb. The housing has an elongated opening through one wall thereof and a grommet is positioned in the opening. The grommet has spaced flanges which engage the inner and outer surfaces of the portion of the housing defining the opening and extend continuously about the opening. An outer swivel plate having substantially the same configuration as the outermost flange engaging the outermost flange and an inside plate having substantially the same configuration as the inner flange of the grommet engages the inner flange. The flanges of the grommet and the inside and outside plates have aligned openings and fastening means extend through the openings. The inside plate has a portion thereof deformed axially outwardly into engagement with the inner surface of the swivel plate and thereby spaces the inside plate with respect to the swivel plate to provide a predetermined compression of the flanges of the grommet against the edge of the opening in the housing.

20 Claims, 8 Drawing Figures

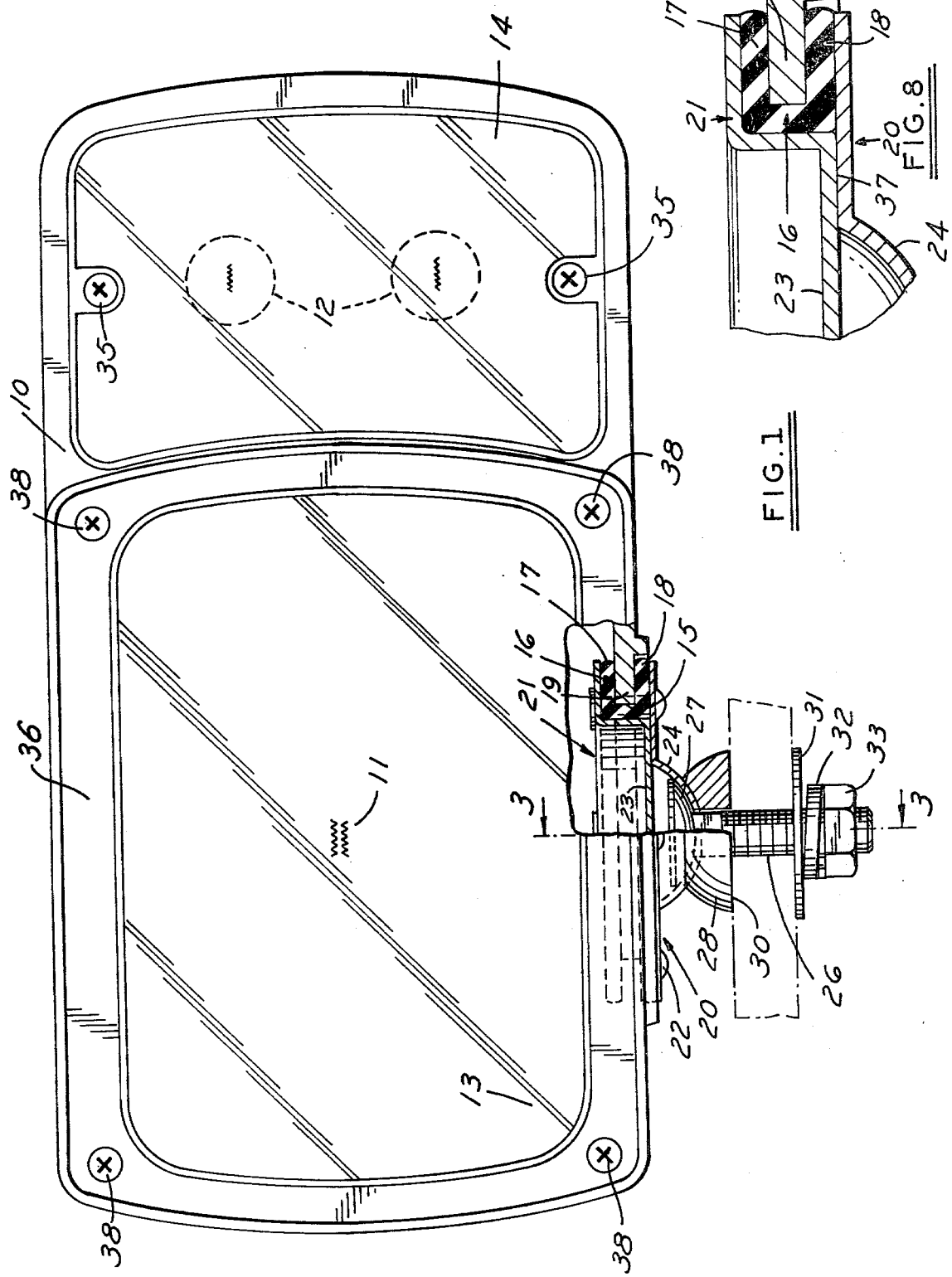

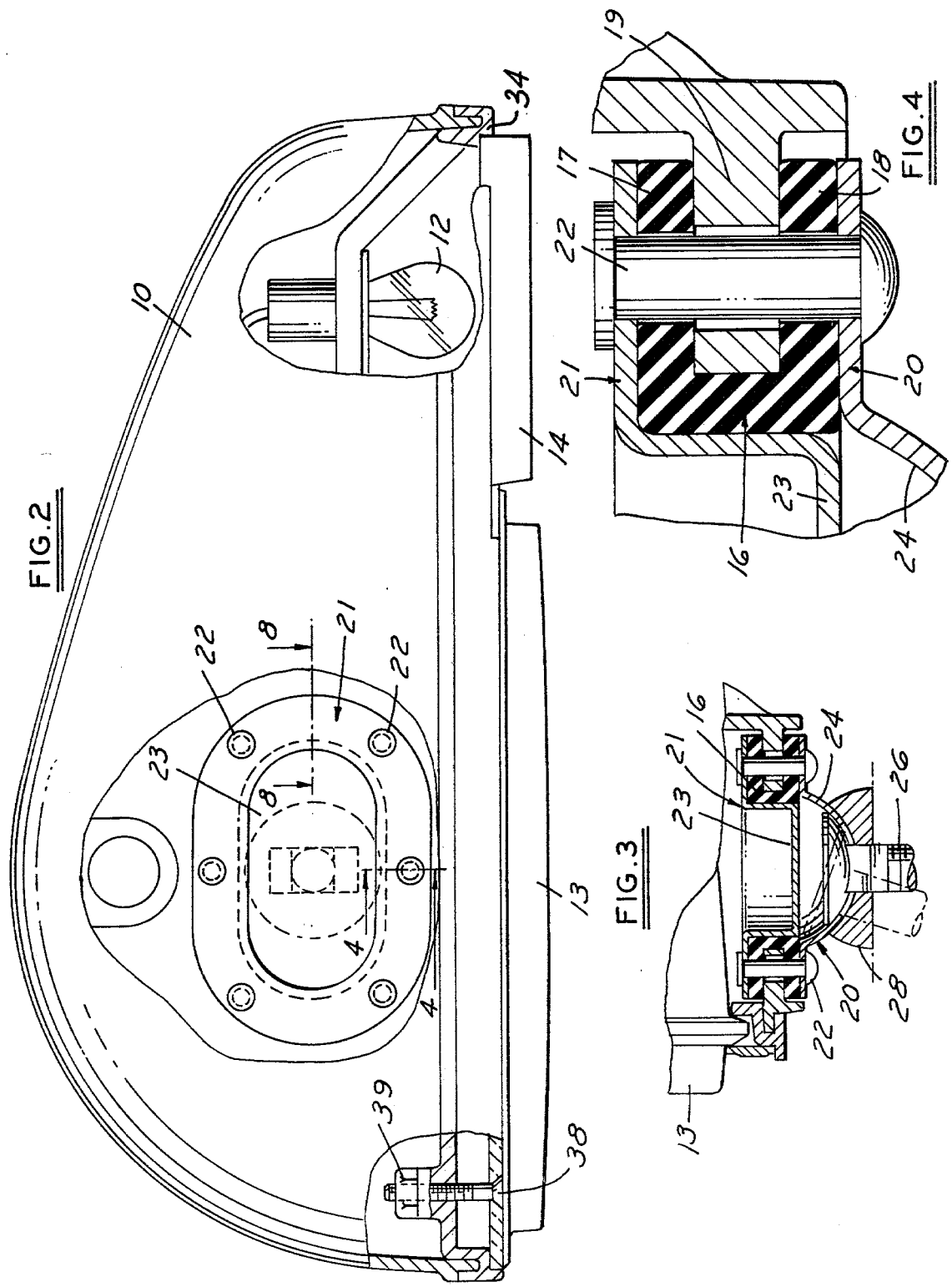

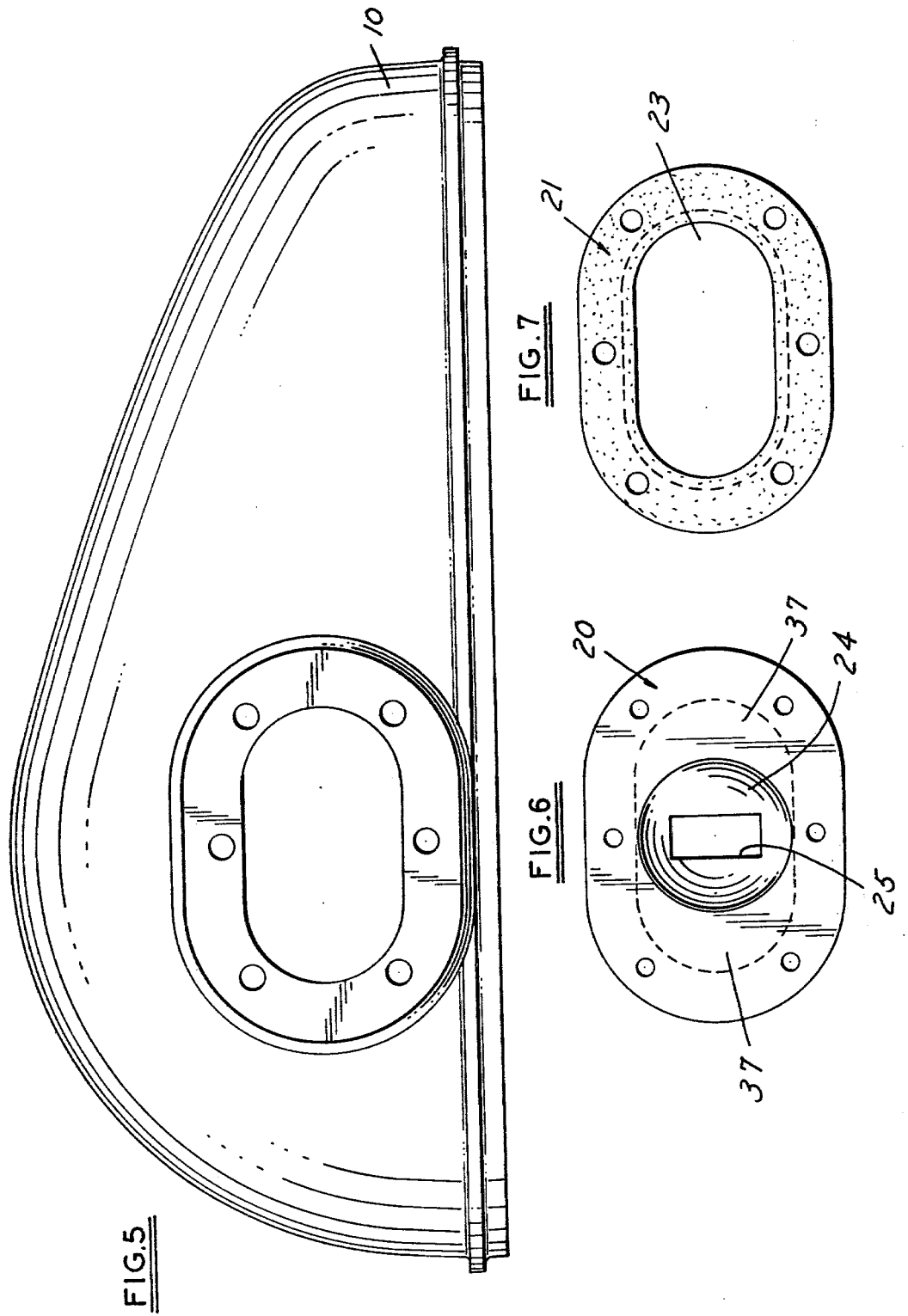

COMBINED HEADLIGHT, TURN SIGNAL AND PARKING LAMP FOR SNOW PLOWS AND THE LIKE

This invention relates to lamps and particularly to a combined headlight, turn signal and parking lamp for snow plows and the like.

BACKGROUND AND SUMMARY OF THE INVENTION

In snow plows and the like it is the usual practice to mount additional headlight, turn signal and parking lamps above the plow blade since the blade usually obscures the originally installed lamps and prevents them from performing their intended function. A snow plow equipped vehicle is subjected to substantial vibration and shock and it is desirable to provide a firm but resilient support for the lamps which will effectively hold the lamps in predetermined adjusted position but, in addition, will protect the lamp bulbs from the severe vibration and shock.

Accordingly among the objectives of the present invention is to provide a combined headlight, turn signal and parking lamp embodying a support system which will hold the lamp in its predetermined adjusted position and at the same time protect the bulbs from damage due to the vibration and shock encountered in use.

Another objective of this invention is to provide a combined headlight, turn signal and parking lamp, which utilizes the popular size 142 mm×200 mm sealed beam headlamp, and provides a lower profile by locating the turn signal and parking portion lamp on the side of the rectangular sealed beam portion and thereby increase the operator's forward visibility compared with lamps heretofore known in the art.

Another objective of this invention is to provide a combined headlight, turn signal and parking lamp with a rectangular sealed beam including a bulb retaining construction wherein the time required to replace the bulbs is minimized compared with known prior art.

Another objective of this invention is to provide a shock free mount for a combined headlight, turn signal and parking lamp to increase the service life of the bulbs and thereby to reduce bulb replacement costs, to promote safety, and to provide increased reliability and convenience under the particularly severe shock and vibration conditions to which snow plow lamps are subjected.

DESCRIPTION OF THE DRAWINGS

FIG. 1 is a part sectional elevational view of a lamp embodying the invention;

FIG. 2 is a part sectional plan view of the same;

FIG. 3 is a sectional view taken along the line 3—3 in FIG. 1;

FIG. 4 is a fragmentary sectional view on an enlarged scale taken along the line 4—4 in FIG. 2;

FIG. 5 is a plan view of the bottom of the lamp housing;

FIG. 6 is a bottom plan view of another portion of the lamp;

FIG. 7 is a plan view of another part of the lamp;

FIG. 8 is a fragmentary sectional view on an enlarged scale taken along the line 8—8 in FIG. 2.

DESCRIPTION

Referring to FIGS. 1 and 2, the combined lamp and turn signals for snow plows and the like embodying the invention comprises a housing 10 which has two compartments, one supporting the sealed beam bulb 11 for the head lamp and the other supporting the bulbs 12 for the turn signal and parking lamp. The housing is preferably made of plastic such as polycarbonate. As shown the combined lamp is for the left side, the lamp for the right side being a mirror image.

Lenses 13, 14 are associated with each compartment. A gasket 34 is associated with lens 14 and is held in position by screws 35. Sealed beam bulb 11 is held in the housing 10 by a retainer rim 36 and screws 38 threaded into self-holding nuts 39 in housing 10.

The bottom wall of the housing 10 is formed with an elongated opening 15 which is preferably shaped to have straight sides and curved ends extending lengthwise of the housing 10. A grommet 16 having an opening, therein is positioned in opening 15 and includes an inner flange 17 and an outer flange 18 that engage the inner and outer surfaces of the edge 19 of opening 15.

An outer swivel plate 20 which has an overall configuration corresponding to that of the outer flange 18 engages the outer surface of the flange 18. An inner plate 21 which has an overall configuration corresponding to that of the inner flange 17 of the grommet 16 engages the inner surface of the inner flange 17. The plates 20, 21 and the flanges 17, 18 as well as the edge 19 of the housing are provided with aligned openings as shown in FIG. 4 and rivets 22 extend through the openings.

The inner plate 21 includes a formed portion 23 corresponding in shape to and extending axially through the opening of the grommet to prevent rotation between the housing and the assembly of the plates 20, 21 and grommet 16. Formed portion 23 abuts the end surfaces 37 of the swivel plate 20 as shown in FIGS. 1 & 8. Because the free uncompressed height of grommet 16 is greater than the distance between the peripheries of plates 20, 21 when rivets 22 are set, a predetermined compression is provided on the grommet 16. This difference in height controls the degree of compression and the force with which the parts are held together.

As further shown in FIGS. 1, 3 and 6, the swivel plate 20 includes a spherical portion 24 extending axially outwardly and having an opening 25 therein. A swivel bolt 26 having a spherical head 27 extends through the opening 25 with the convex spherical head 27 engaging the inner concave spherical surface of the portion 24. A mounting washer 28 is provided on the exterior of the deformed portion 24 and has a concave surface engaging the exterior surface of the portion 24 and a flat surface 30 for engaging part of the frame or body of the snow plow. Finally, a washer 31, lock washer 32 and nut 33 are provided for completing the mounting on the vehicle.

The swivel plate 20 and the inner plate 21 are preferably made of metal such as cold rolled steel and the grommet 16 is made of a resilient material such as rubber preferably having a durometer of 70±5 on the shore A scale. The grommet 16 should have good elasticity and memory properties at both cold and hot temperatures, preferably 120° C. to −45° C.; good tensile strength preferably at least 1500 lbs/square inch (10.4 MPa); and be resistant to abrasion, aromatic vapors, sunlight, ozone, water and aging. Preferably the grommet 16 is a single molded piece but it may be constructed of one or more sections.

In use, the construction provides a combined headlight, turning and parking lamp for snow plows which increases the service life of the bulbs of the lamp under the particularly severe shock and vibration conditions to which snow plow equipped vehicles are subjected.

We claim:

1. A lamp comprised of a housing and at least one bulb, said housing having an opening through one wall thereof,
    a grommet of resilient material positioned in said opening,
    said grommet having spaced radially outwardly extending flanges engaging the inner and outer surfaces of said housing adjacent said opening,
    an outside plate engaging said outside flange of said grommet
    an inside plate engaging said inside flange of said grommet
    said inside plate having a portion formed outwardly toward said outside plate,
    fastening means holding said inside plate and said outside plate together,
    the height of said outwardly formed portion being less than the height of said grommet providing compression of said grommet flanges against said inner and outer surfaces of said housing adjacent said opening,
    mounting means on said outside plate attaching said lamp to a vehicle.

2. The lamp set forth in claim 1 wherein said opening is non circular.

3. The lamp set forth in claim 1 wherein said grommet extends continuously around said opening.

4. The lamp set forth in claim 1 wherein said grommet is made from a plurality of pieces.

5. The combination set forth in claim 1 wherein said housing, said inner plate, said outer plate and said grommet having aligned openings therein
    said fastening means passing through said aligned openings.

6. The lamp set forth in claim 1 wherein said grommet is made of a resilient material having a durometer of 70±5 on the shore A scale.

7. The lamp set forth in claim 1 wherein said grommet is made of a material that maintains its elasticity and memory at temperatures ranging between 120° C. and −45° C.

8. The lamp set forth in claim 1 wherein said grommet is made of a material having a tensile strength of at least 1500 lbs/square inch.

9. The lamp set forth in claim 1 wherein said grommet is made of a material that is resistant to abrasion, aromatic vapors, sunlight, ozone, water and aging.

10. A combined lamp and turn signal for a snow plow or the like comprising a housing adapted to support a bulb,
    said housing having an elongated opening through one wall thereof including straight sides and curved ends,
    a grommet of resilient material positioned in said opening,
    said grommet having spaced flanges engaging the inner and outer surfaces of the portion of the housing defining the opening,
    said flanges extending continuously about said opening,
    an outer plate having substantially the same configuration as the outermost flange and engaging said outermost flange,
    an inner plate having substantially the same configuration as the inner flange of the grommet and engaging said inner flange,
    fastening means extending between said plates to compress said flanges against the rim of said opening in said housing,
    said inner plate having a portion thereof deformed axially outwardly into engagement with the inner surface of said outer plate and thereby spacing said inner plate with respect to the outer plate and providing a predetermined compression of said flanges of said grommet against said edge of said opening,
    said deformed portion of said inner plate having substantially the same configuration as the opening in said grommet and engaging the curved ends of the portion of the grommet along the curved ends of said opening but being spaced from the portion of the grommet connecting said flanges extending along the straight sides of said opening,
    said inner plate includes a portion extending outwardly of the housing and defining an inner spherical surface,
    said last-mentioned deformed portion having an elongated opening therein,
    a swivel bolt extending through said opening,
    said swivel bolt having a spherical head engaging the inner spherical surface of said deformed portion of said swivel plate.

11. The lamp set forth in claim 10 including a mounting washer on said bolt and having a concave spherical surface engaging a complementary surface on the outer surface of said deformed portion of the swivel plate, and fastener means on said bolt.

12. The lamp set forth in claim 11 wherein said fastener means comprises a washer,
    a lock washer,
    and a nut threaded on said swivel bolt.

13. The lamp set forth in claim 10 wherein said grommet is made of a resilient material having a durometer of 70±5 on the shore A scale.

14. The lamp set forth in claim 10 wherein said grommet is made of a material that maintains its elasticity and memory at temperatures ranging between 120° C. and −45° C.

15. The lamp set forth in claim 10 wherein said grommet is made of a material having a tensile strength of at least 1500 lbs/square inch.

16. The lamp set forth in claim 10 wherein said grommet is made of a material that is resistant to abrasion, aromatic vapors, sunlight, ozone, water and aging.

17. A lamp comprised of a housing and at least one bulb, said housing having an opening through one wall thereof,
    a grommet of resilient material positioned in said opening,
    said grommet having spaced flanges engaging the inner and outer surfaces of said housing adjacent said opening,
    an outside plate engaging said outside flange of said grommet,
    an inside plate engaging said inside flange of said grommet,
    said inside plate having a portion formed outwardly toward said outside plate, fastening means holding said inside plate and said outside plate together, the height of said formed portion being less than the height of said grommet providing compression of said grommet against said inner and outer surfaces of said housing adjacent said opening, mounting means on said outside plate attaching said lamp to a vehicle, said inner plate having a portion thereof deformed axially outwardly into engagement with the inner surface of said outer plate and thereby spacing said inside plate with respect to the outer plate, the distance between the portions of said outer plate and inner plate which engage said flanges of said grommet being less than the thickness of said grommet axially between said flanges thereby providing a predetermined compression of said flanges of said grommet against said edge of said opening.

18. The lamp set forth in claim 17 wherein said deformed portion of said outer plate having substantially the same configuration as the opening in said grommet and engaging the ends of the opening in said grommet but being spaced from the portion of the grommet connecting said flanges extending along the sides of the opening.

19. The head lamp set forth in claim 17 wherein said mounting means comprises a portion on said outer plate extending outwardly of the housing and defining an inner spherical surface, said last-mentioned deformed portion having an elongated opening therein, a swivel bolt extending through said opening, said swivel bolt having a spherical head engaging the inner spherical surface of said deformed portion of said outer plate.

20. The lamp set forth in claim 19 including a mounting washer on said bolt and having a concave spherical surface engaging a complementary surface on the outer surface of said deformed portion of the outer place, and fastener means on said bolt.

* * * * *